(12) United States Patent
Johnson et al.

(10) Patent No.: US 9,280,388 B2
(45) Date of Patent: Mar. 8, 2016

(54) METHOD AND APPARATUS FOR EFFICIENT SCHEDULING OF MULTITHREADED PROGRAMS

(71) Applicant: Oracle International Corporation, Redwood Shores, CA (US)

(72) Inventors: Darrin P. Johnson, San Jose, CA (US); Kishore Kumar Pusukuri, Santa Clara, CA (US); Eric C. Saxe, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 13/873,640

(22) Filed: Apr. 30, 2013

(65) Prior Publication Data
US 2014/0208330 A1    Jul. 24, 2014

Related U.S. Application Data

(60) Provisional application No. 61/755,233, filed on Jan. 22, 2013.

(51) Int. Cl.
| | |
|---|---|
| *G06F 9/46* | (2006.01) |
| *G06F 9/48* | (2006.01) |
| *G06F 9/50* | (2006.01) |
| *G06F 9/52* | (2006.01) |

(52) U.S. Cl.
CPC ............ *G06F 9/4881* (2013.01); *G06F 9/5027* (2013.01); *G06F 9/52* (2013.01); *G06F 2209/483* (2013.01); *G06F 2209/485* (2013.01); *G06F 2209/508* (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 7,685,599 B2 * | 3/2010 | Kanai et al. | 718/104 |
| 8,205,100 B2 | 6/2012 | Saxe et al. | |
| 8,219,993 B2 | 7/2012 | Johnson et al. | |
| 2006/0010444 A1 * | 1/2006 | Seidman et al. | 718/100 |
| 2009/0049451 A1 * | 2/2009 | Bates | 718/108 |
| 2012/0159623 A1 * | 6/2012 | Choi | 726/22 |

OTHER PUBLICATIONS

C. Bienia, S. Kumar, J.P. Singh, and K. Li; "The PARSEC Benchmark Suite: Characterization and Architectural Implications;" Princeton University Technical Report TR-811-08; Jan. 2008 (22 pages).

(Continued)

*Primary Examiner* — Gregory A Kessler
(74) *Attorney, Agent, or Firm* — Osha Liang LLP (57) ABSTRACT

In general, the invention relates to a non-transitory computer readable medium comprising instructions, which when executed by a processor perform a method. The method includes obtaining lock overhead times for a plurality of threads, generating a set of thread groups, wherein each of the plurality of threads is assigned to one of the plurality of thread groups based on the lock overhead times, allocating at least one core of a multi-core system to each of the plurality of thread groups, and assigning a time-quantum for each of the plurality of thread groups, wherein the time-quantum for each of the plurality of thread groups corresponds to an amount of time that threads in each of the plurality of thread groups can execute on the at least one allocated core.

18 Claims, 7 Drawing Sheets

(56) References Cited

OTHER PUBLICATIONS

K. K. Pusukuri, R. Gupta, L. N. Bhuyan; "Thread Reinforcer: Dynamically Determining Number of Threads via OS Level Monitoring;" IISWC '11 Proceedings of the 2011 IEEE International Symposium on Workload Characterization; Nov. 6, 2011 (10 pages).

K. K. Pusukuri, R. Gupta, L. N. Bhuyan; "No More Backstabbing . . . A Faithful Scheduling Policy for Multithreaded Programs;" PACT '11 Proceedings of the 2011 International Conference on Parallel Architectures and Compilation Techniques; Oct. 10, 2011 (10 pages).

R. McDougall and J. Mauro. Solaris Internals. Second Edition; Prentice Hall Publications, 2007 (1020 pages).

R. McDougall, J. Mauro, and B. Gregg. Solaris Performance and Tools: DTrace and MDB Techniques for Solaris 10 and OpenSolaris, Prentice Hall Publications, 2007 (444 pages).

S. P. Lloyd; "Least Squares Quantization in PCM". IEEE Transactions on Information Theory, vol. IT-28 Issue 2; Mar. 1982 (9 pages).

* cited by examiner

| Thread Identifier | Lock Overhead Time Value | Processor Utilization |
|---|---|---|
| Thread A | 41% | 21% |
| Thread B | 67% | 3% |
| Thread C | 71% | 8% |
| Thread D | 53% | 6% |
| Thread E | 33% | 18% |
| Thread F | 62% | 5% |
| Thread G | 80% | 7% |
| Thread H | 75% | 9% |
| Thread I | 49% | 2% |
| Thread J | 31% | 17% |

FIG. 4B

| Group | Thread Identifier | Allocated Cores | Time-Quantum Allocation | Assigned Priority |
|---|---|---|---|---|
| Group X | Thread J | Cores 1-7 | 200 ms | 1 |
| | Thread E | Cores 1-7 | 200 ms | 1 |
| | Thread A | Cores 1-7 | 200 ms | 1 |
| Group Y | Thread I | Core 8 | 50 ms | 2 |
| | Thread D | Core 8 | 50 ms | 2 |
| Group Z | Thread F | Cores 9-12 | 100 ms | 3 |
| | Thread B | Cores 9-12 | 100 ms | 3 |
| | Thread C | Cores 9-12 | 100 ms | 3 |
| | Thread H | Cores 9-12 | 100 ms | 3 |
| | Thread G | Cores 9-12 | 100 ms | 3 |

METHOD AND APPARATUS FOR EFFICIENT SCHEDULING OF MULTITHREADED PROGRAMS

CROSS-REFERENCE TO RELATED APPLICATIONS

Pursuant to 35 U.S.C. §119 (e), this application claims benefit of U.S. Provisional Application No. 61/755,233 filed on Jan. 22, 2013, entitled "Method and Apparatus for Efficient Scheduling of Multithreaded Programs." The disclosure of this U.S. Provisional Application is incorporated herein by reference in its entirety.

BACKGROUND

Many modern computing systems are capable of executing multiple process threads concurrently. Applications instrumented with multiple threads of execution are able to utilize the advantages of such systems. However, the threads in multi-threaded applications may frequently perform operations targeting the same hardware resources. Competition for access to these resources may result in inefficient utilization of those resources.

SUMMARY

In general, in one aspect, the invention relates to a non-transitory computer readable medium comprising instructions, which when executed by a processor perform a method. The method includes obtaining lock overhead times for a plurality of threads, generating a set of thread groups, wherein each of the plurality of threads is assigned to one of the plurality of thread groups based on the lock overhead times, allocating at least one core of a multi-core system to each of the plurality of thread groups, and assigning a time-quantum for each of the plurality of thread groups, wherein the time-quantum for each of the plurality of thread groups corresponds to an amount of time that threads in each of the plurality of thread groups can execute on the at least one allocated core.

In general, in one aspect, the invention relates to a system. The system includes a plurality of cores, a thread monitor, and a scheduler. The thread monitor is configured to perform a method comprising obtaining lock overhead times for a plurality of threads. The scheduler is configured to perform a method comprising generating a set of thread groups, wherein each of the plurality of threads is assigned to one of the plurality of thread groups based on the lock overhead times, allocating at least one core of the plurality of cores to each of the plurality of thread groups, and assigning a time-quantum for each of the plurality of thread groups, wherein the time-quantum for each of the plurality of thread groups corresponds to an amount of time that threads in each of the plurality of thread groups can execute on the at least one allocated core.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scheduling threads in a multicore processor system. Specifically, embodiments of the invention may be used to schedule threads by assigning different resources to groups of similar threads.

Figure 1:
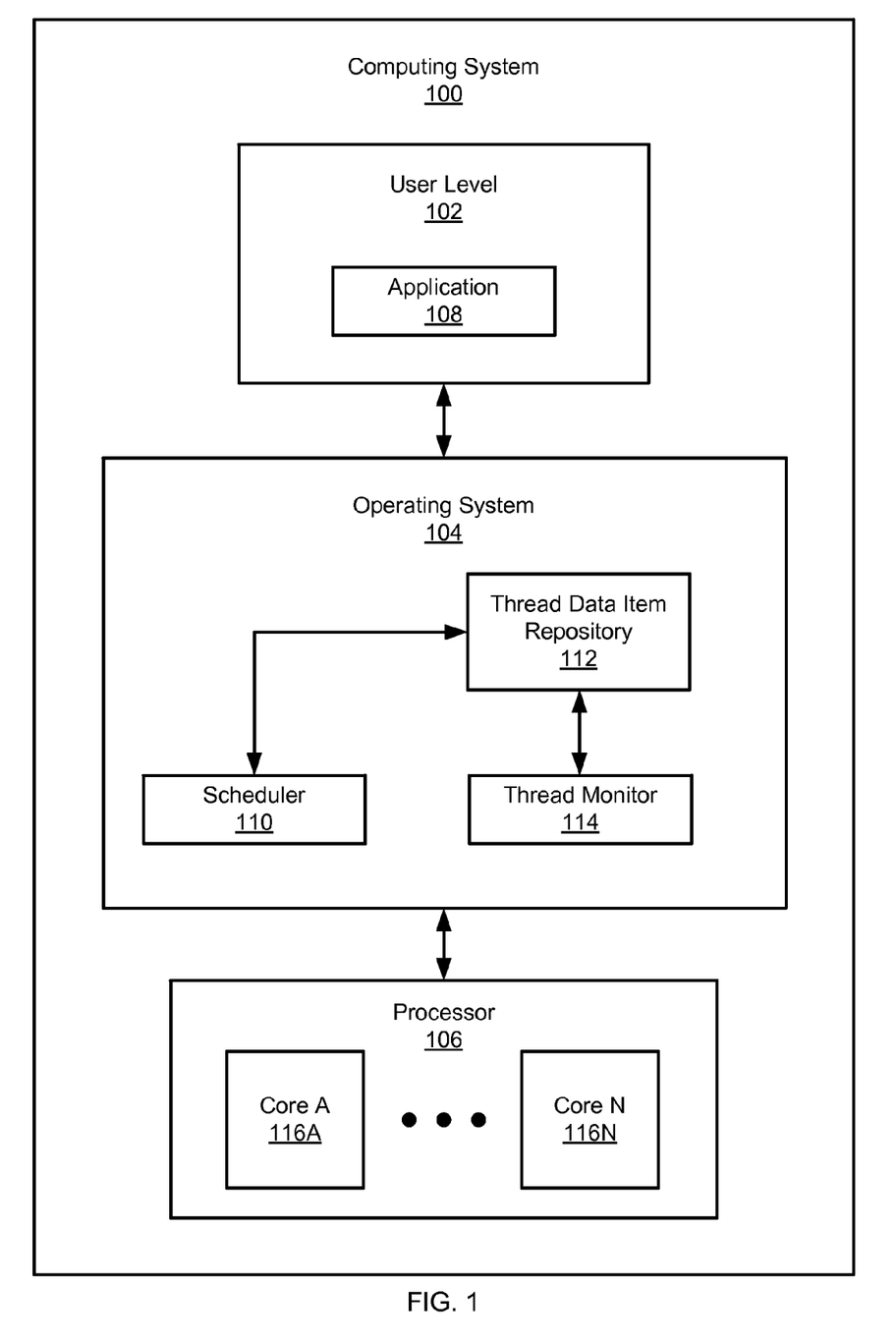
FIG. 1 shows a system in accordance with one or more embodiments of the invention.

FIG. 1 shows a diagram of a system in accordance with one or more embodiments of the invention. As shown in FIG. 1, the computing system (100) includes a user level (102), an operating system (104), and a processor (106). The user level (102) includes an application (108). The operating system (104) includes a scheduler (110), a thread data item repository (112), and a thread monitor (114). The processor (106) includes multiple cores (core A (116A), core N (116N)).

In one or more embodiments of the invention, the user level (102) and the operating system (104) are sets of instructions stored in memory and executing on a processor (e.g., processor (106)). In one or more embodiments of the invention, the operating system (104) provides an interface between the user level (102) and the hardware resources of the computing system (e.g., processor (106)). Specifically, the operating system (104) includes functionality to execute its own processes and processes initiated in the user level (102) using the hardware resources. The operating system may also provide processes access to hardware resources, such as memory and input/output (I/O) resources. Further, the operating system (104) may be configured to execute virtual resources. Such virtual resources may be used to host virtual operating systems, create virtual networks connecting virtual hardware devices, etc. The operating system (104) may include multiple elements not shown in FIG. 1.

In one or more embodiments of the invention, the user level (102) is the software layer of the computing system (100) with which the user interacts. Specifically, the user level (102) is a portion of memory assigned for use by application software (e.g., application (108)) and not reserved for use by processes within the operating system (i.e., kernel level processes). Application software (e.g., application (108)) may include any process or group of processes that performs a task for a user of the computing system (100).

In one or more embodiments of the invention, the application (108) is a process or group of processes executing in the user level (102) of the computing system (100). In one or more embodiments of the invention, the application (108) is instrumented with multiple threads of execution. In one or more embodiments of the invention, a thread is a sequence of instructions executed by a processor (e.g., processor (106)). A single process may include multiple threads of execution, and each thread within the process may be executed concurrently with one or more other threads.

In one or more embodiments of the invention, execution of instructions by a thread may require the use of one or more resources on the computing system (100). Consequently, a thread competing for access to the same resource as another thread may spend a percentage of its execution time waiting for other threads to free the resource. Some resources may require that a thread obtain a lock on the resource to prevent concurrent access to that resource by other threads. In one or more embodiments of the invention, the lock overhead time is the percent of execution time a thread spends waiting for locks on resources necessary for the thread to execute instructions.

In one or more embodiments of the invention, the processor (106) is a hardware component of the computing system (100) with functionality to execute threads. In one or more embodiments of the invention, the processor (106) includes multiple cores (core A (116A), core N (116N)), each of which is capable of processing threads independent of other cores on the processor (100). Multiple threads of a process or application (e.g., application (108)) may execute on the same core, different cores, or a combination of cores. Cores (core A (116A), core N (116N)) of a processor (106) may be referred to as a thread context.

In one or more embodiments of the invention, the scheduler (110) is a kernel level process with functionality to schedule threads for execution by the processor (106). The scheduler (110) may also include functionality to determine which threads are executed by which cores (core A (116A), core N (116N)), determine the order in which the threads are executed (e.g., higher priority threads are placed ahead of lower priority threads), and determine the time allotted for a thread to execute (i.e., time-quantum). The scheduler (110) may schedule threads according to a scheduling policy.

In one or more embodiments of the invention, the thread monitor (114) is a process or group of processes with functionality to obtain characteristics of threads executing on the processor (106). Specifically, the thread monitor (114) may generate data regarding the manner in which a thread executes. Such data may include the lock overhead time of a thread and the processor utilization of a thread.

In one or more embodiments of the invention, processor utilization for a thread may refer to the number of a thread's instructions executed by the processor's instruction pipeline(s) per unit time, relative to the number of instructions executed by the processor's pipeline(s) for all threads concurrently executing on the processor for that same time. In one or more embodiment of the invention, the processor utilization of a thread includes the temporal processor utilization and/or the spatial processor utilization. Temporal processor utilization may include the percentage of execution time the thread spends using the processor. In one or more embodiments of the invention, processor utilization refers to the combined percentage of time that the thread spends executing in the user level (102) and the kernel level. Spatial processor utilization processor utilization may be a value indicating the percent of processor pipeline (or other functional unit) utilization over capacity per unit time.

In one or more embodiments of the invention, the thread data item repository (112) is a data structure with functionality to store the data collected by the thread monitor (114) and provide that data to the scheduler (110). In one or more embodiments of the invention, the thread data item repository (112) includes data items corresponding to different threads executing on the computing system (100). In one or more embodiments of the invention, the thread data item repository (112) is located external to the operating system. Further detail about the thread data item repository (112) is provided in FIG. 2.

Figure 2:
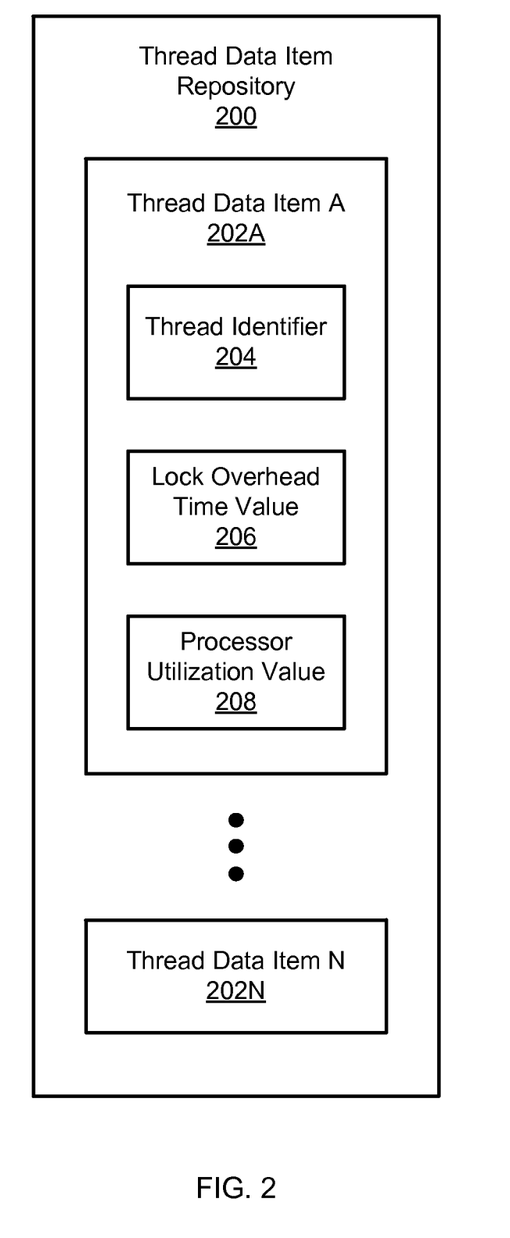
FIG. 2 shows a thread data item repository in accordance with one or more embodiments of the invention.

FIG. 2 shows a thread data item repository in accordance with one or more embodiments of the invention. Specifically, as shown in FIG. 2, the thread data item repository (200) includes a number of thread data items (thread data item A (202A), thread data item N (202N)). Each thread data item (thread data item A (202A), thread data item N (202N)) includes a thread identifier (204), a lock overhead time value (206), and a processor utilization value (208).

In one or more embodiments of the invention, each thread data item (thread data item A (202A), thread data item N (202N)) stored in the thread data item repository (200) stores information about a corresponding thread executing on a processor of the computing system. In one or more embodiments of the invention, the thread identifier (204) is a unique handle used by elements of the operating system to distinguish one thread data item thread data item (thread data item A (202A), thread data item N (202N)) from another.

In one or more embodiments of the invention, the lock overhead time value (206) is a value indicating the percent of execution time a thread spends waiting for locks on resources. The lock overhead time value (206) may be an average of multiple sampled values. In one or more embodiments of the invention, the processor utilization value (208) is a value indicating the percent of execution time a thread spends using the processor. The processor utilization value (208) may be an average of multiple sampled values.

Figure 3:
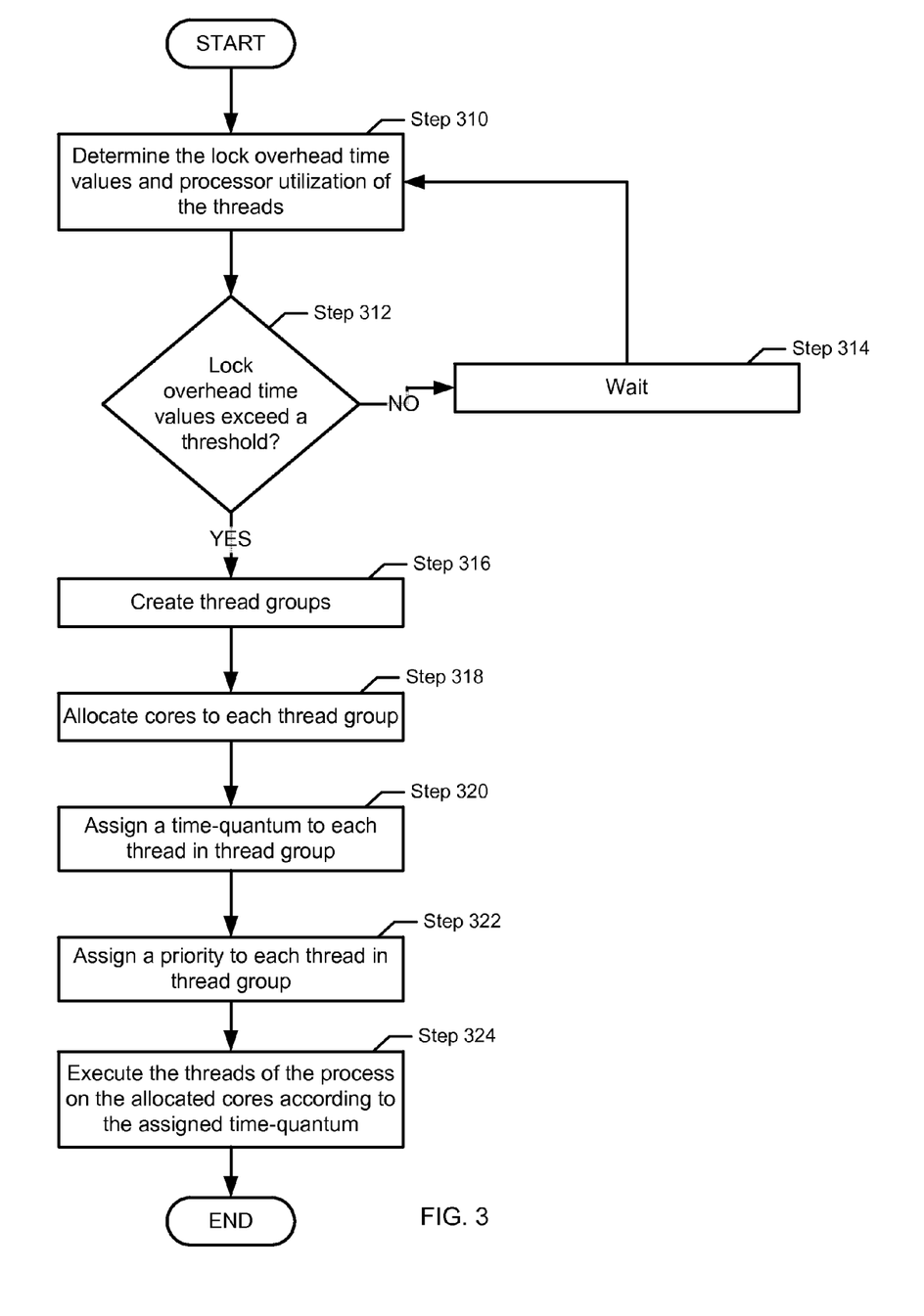
FIG. 3 shows a flow diagram in accordance with one or more embodiments of the invention.

FIG. 3 shows a flowchart for creating thread groups in accordance with one or more embodiments of the invention. Specifically, FIG. 3 shows the steps taken by a scheduler to implement a thread-group based scheduling policy. While the various steps in these flowcharts are presented and described sequentially, one of ordinary skill will appreciate that some or all of the steps may be executed in different orders, may be combined or omitted, and some or all of the steps may be executed in parallel.

In Step 310, the thread monitor determines the lock overhead time values and processor utilization of each thread executing on the computing system. In one or more embodiments of the invention, the thread monitor collects thread data (e.g., lock overhead time values and processor utilization values) at regular intervals over a monitoring duration. In one or more embodiments of the invention, the monitoring duration period is one second.

In Step 312, the scheduler determines whether the lock overhead time values exceed a threshold. In one or more embodiments of the invention, the threshold may be compared to the lock overhead time values of all executing threads in different ways. For example, the threshold may be compared to a mean lock overhead time value of all executing threads, the minimum lock overhead time value of the executing threads, or the maximum lock overhead time value of the executing threads. In one or more embodiments of the invention, the threshold is 5%.

If in Step 312, the scheduler determines that the lock overhead time values do not exceed the threshold, then in Step 314, the scheduler waits while the lock overhead time values are refreshed by the thread monitor. If in Step 312, the scheduler determines that the lock overhead time values do exceed the threshold, then in Step 316, the scheduler creates a number of thread groups. In one or more embodiments of the invention, the thread groups are created using the lock overhead time values of each thread as stored in the corresponding thread data item. In one or more embodiments of the invention, threads with similar lock overhead time values are placed together in thread groups. In one or more embodiments of the invention, the thread groups are determined by clustering each thread in a group with the nearest-matching mean lock overhead time value (e.g., using a kmeans clustering algorithm). Said another way, threads may be grouped such that the variation of lock overhead time values within the group is minimized. Such grouping may be accomplished using a k-means algorithm. Thread groups may be created using other algorithms or mechanisms not discussed above without exceeding the scope of the invention.

In Step 318, processor cores are allocated to each thread group. In one or more embodiments of the invention, a greater relative number of cores is assigned to thread groups with lower relative lock overhead time values, and fewer relative cores are assigned to thread groups with higher relative lock overhead time values.

In one embodiment of the invention, the number of cores assigned is based on the total processor utilization of the thread group. In one or more embodiments of the invention, the total processor utilization of a thread group is calculated using the following formula:

$$G_{util} = \sum_{T=1}^{N} T_{util},$$

where $G_{util}$ is the total processor utilization for the thread group, $T_{util}$ is processor utilization for a thread in the thread group (G), and N is the number of threads in the thread group. Using the total processor utilization ($G_{util}$) for a thread group, the number of cores to allocate to that thread group may be calculated using the following formula:

$$G_{cores} = \frac{G_{util}}{Total_{util}}(Total_{cores}),$$

where $G_{cores}$ is the number of cores allocated to the thread group, $G_{util}$ is the processor utilization for the thread group, $Total_{util}$ is a sum total of processor utilization for all thread groups, and $Total_{cores}$ is a number of cores in the multi-core system.

In one or more embodiments of the invention, the number of resources allocated for a particular thread group is based on both the temporal utilization and the spatial utilization. Thread groups with lower temporal utilization may be allocated fewer resources due to less contention for processor time. Thread groups with lower spatial utilization may be allocated fewer resources due to less contention for the functional units of the processor (e.g. instruction pipeline bandwidth). Both metrics may be considered when determining the overall resource allocation for each thread group.

In Step 320, a time-quantum is assigned to each thread in a thread group. In one or more embodiments of the invention, the same time-quantum is assigned to each thread in a thread group. In one or more embodiments of the invention, the time-quantum for each thread group is determined based on the processor utilization of the thread group. For example, the threads in a thread group with a low processor utilization may be assigned a smaller time-quantum than is assigned to the threads in a thread group with a higher processor utilization. In one or more embodiments of the invention, the time-quantums are assigned using a time-quantum table generated from empirical data. Such a table may include a set of processor utilization ranges, each mapped to a time-quantum. In one embodiment of the invention, the assigned time-quantums range from 50 milliseconds (ms) to 500 ms.

In Step 322, the same priority is assigned to each thread in the group. In one or more embodiments of the invention, each thread in a thread group is assigned the same priority in order to prevent one thread from superseding (i.e., context switch) another based on differing priorities. In Step 324, the threads of the process are executed on their allocated cores according to their assigned time-quantum.

In one or more embodiments of the invention, each thread in a thread group is assigned the same priority in order to neutralize priority among threads of the same group. Specifically, assigning each thread in the thread group the same priority ensures that threads in a group are executed in first-in-first-out fashion with respect to the order in which they become runnable. This prevents higher priority runnable threads from preempting (e.g., forcing a processor to be surrendered) lower priority executing threads in the group, which may lead to overall inequity between threads during the allocated processor time.

In one or more embodiments of the invention, resources allocated to a thread group are used exclusively by that thread group. Alternatively, in one or more embodiments of the invention, two or more thread groups may share a resource or a group of resources. Access to a resource shared by two or more thread groups may be managed in a variety of ways. For example, thread groups may be gang scheduled with respect to one another at a different time-quantum.

In one or more embodiments of the invention, Step 316 through Step 324 may be repeated based on a subsequent trigger, such as the expiration of a period of time or a change in the lock overhead time values. In one or more embodiments of the invention, in the event that the lock contention and/or temporal processor utilization is low, each thread's temporal processor utilization is determined by factors other than lock interaction with other threads in the group and grouping threads based on lock contention may be less effective. In one or more embodiments of the invention, the thread monitor tracks a lock that is dominant in the lock contention in order to create groups of threads contending for the same lock rather than a group of threads contending for different locks and having similar contention rates.

Figure 4A:
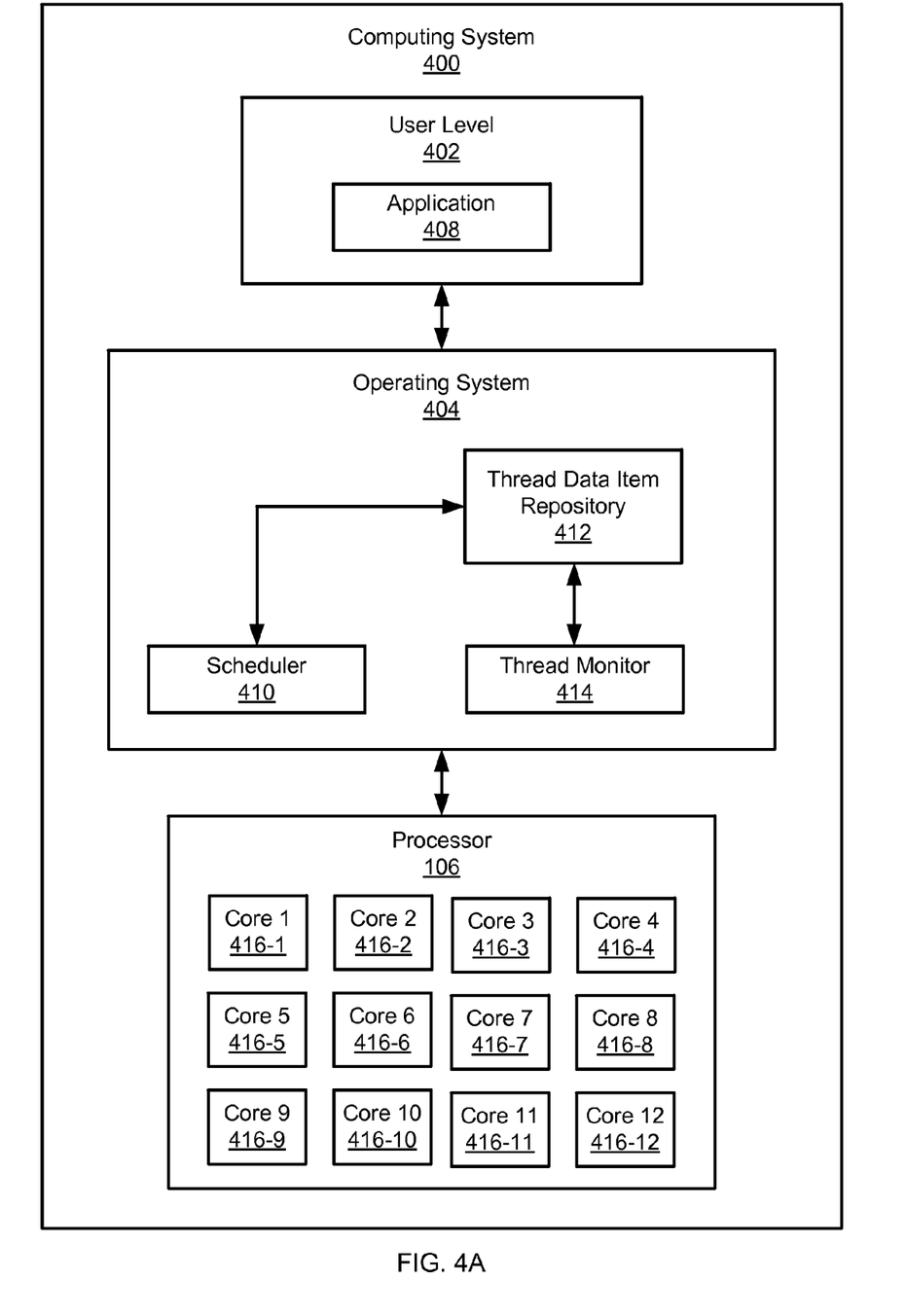
FIGS. 4A-4C show an example in accordance with one or more embodiments of the invention.
Figure 4B:
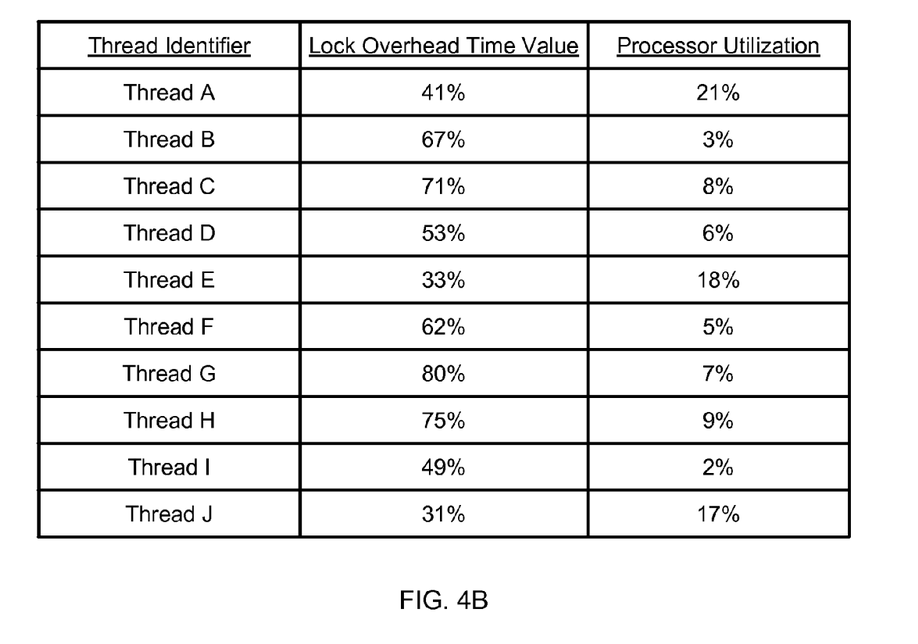
Figure 4C:
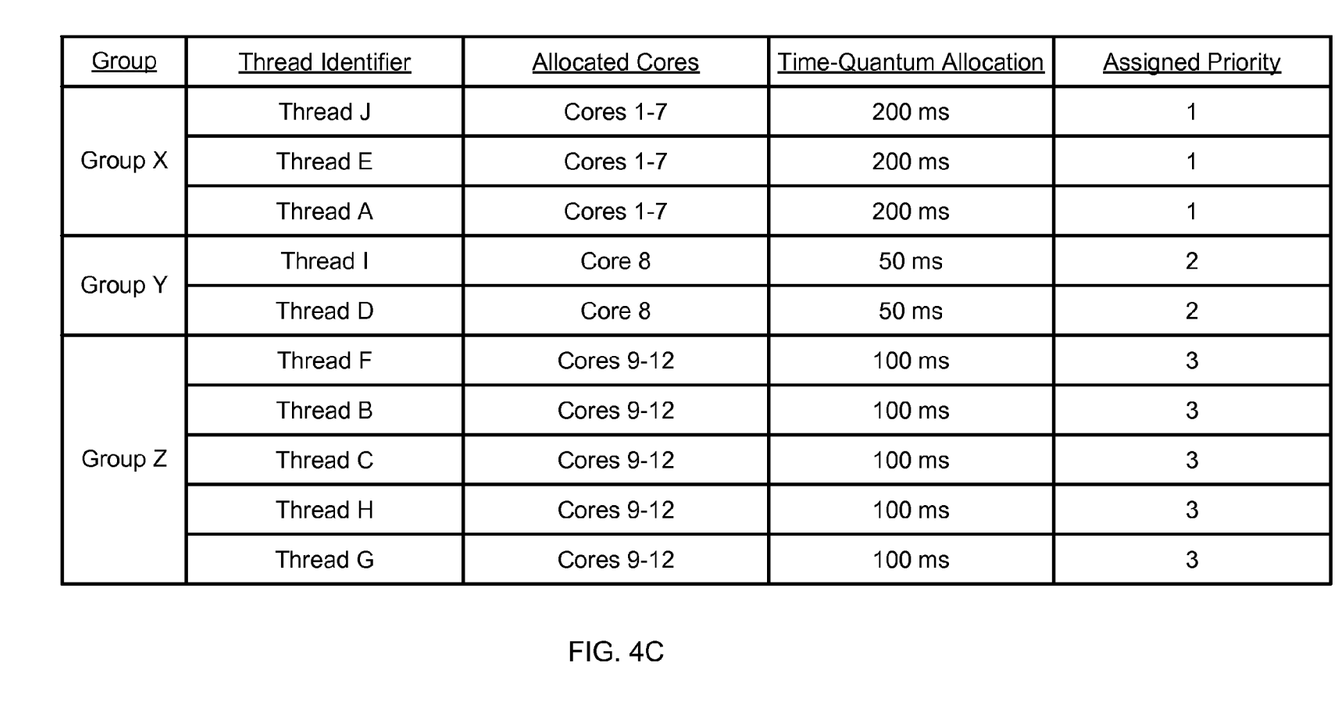

FIGS. 4A-4C show an example in accordance with one or more embodiments of the invention. The example is not intended to limit the scope of the invention in any way. FIG. 4A shows an example system in accordance with one or more embodiments of the invention. As shown in FIG. 4A, the example computing system (400) includes a user level (402), an operating system (404), and a processor (406). The user level (402) includes an application (408). The operating system (404) includes a scheduler (410), a thread data item repository (412), and a thread monitor (414). The processor (406) includes twelve cores (core 1 (416-1), core 2 (416-2), core 3 (416-3), core 4 (416-4), core 5 (416-5), core 6 (416-6), core 7 (416-7), core 8 (416-8), core 9 (416-9), core 10 (416-10), core 11 (416-11), core 12 (416-12)).

Assume for the purposes of the example, that application (408) is a multi-threaded application. Assume further that there are currently 10 threads (thread A, thread B, thread C, thread D, thread E, thread F, thread G, thread H, thread I, thread J) executing on the processor (406). Assume further that the threads are being executed according to a time share scheduling policy (e.g., a scheduling policy based on divided processor time and thread priority).

FIG. 4B shows example data stored in the thread data item repository (412). Specifically, FIG. 4B shows example data gathered by the thread monitor (414) during a monitoring duration of executing threads. As shown in FIG. 4B, thread A has a lock overhead time value of 41% and a processor utilization of 21%, thread B has a lock overhead time value of 67% and a processor utilization of 3%, thread C has a lock overhead time value of 71% and a processor utilization of 8%, thread D has a lock overhead time value of 53% and a processor utilization of 6%, thread E has a lock overhead time value of 33% and a processor utilization of 18%, thread F has a lock overhead time value of 62% and a processor utilization of 5%, thread G has a lock overhead time value of 80% and a processor utilization of 7%, thread H has a lock overhead time value of 75% and a processor utilization of 9%, thread I has a lock overhead time value of 49% and a processor utilization of 2%, and thread J has a lock overhead time value of 31% and a processor utilization of 17%.

Assume that the scheduler is configured to implement the thread-group based scheduling policy (as described in FIG. 3) if the average of all lock overhead time values exceed a threshold of 5%. Upon accessing the thread data item repository (412) and determining that the average of all lock overhead time values exceeds the threshold of 5%, the scheduler creates thread groups according to a k-means algorithm. Assume that applying the k-means algorithm results in the creation of three thread groups (group X, group Y, group Z), each with closely matching lock overhead time values.

FIG. 4C shows a table of the cores, time-quantum, and priority allocated to each thread in each thread group. As shown in FIG. 4C, thread J, thread E, and thread A, with lock overhead time values of 31%, 33%, and 41%, respectively, have been assigned to group X. Thread I and thread D, with lock overhead time values of 49% and 53%, respectively, have been assigned to group Y. Thread F, thread B, thread C, thread H, and thread G, with lock overhead time values of 62%, 67%, 71%, 75%, and 80%, respectively, have been assigned to group Z.

Continuing with FIG. 4C, the scheduler (410) has determined the total processor utilization for each thread group according to the formula $$G_{util} = \sum_{T=1}^{N} T_{util}$$

as discussed in FIG. 3. The resulting $G_{util}$ is 56% for group X, 8% for group Y, and 32% for group Z.

Assume that the total processor utilization for computing system (100) is 96%. The scheduler (410) then assigns cores to each thread group according to the formula $$G_{cores} = \frac{G_{util}}{Total_{util}}(Total_{cores})$$

as discussed in FIG. 3. The resulting $G_{cores}$ value for group X is seven cores, the resulting $G_{cores}$ value for group Y is one core, and the resulting $G_{cores}$ value for group Z is four cores. Accordingly, group X has been allocated cores 1-7, group Y has been allocated core 8, and group Z has been allocated cores 9-12.

The scheduler (410) then assigns a time-quantum to each thread. Assume that the scheduler assigns time-quantums to threads based on the following table:

| $G_{util}$ | Time-Quantum |
|---|---|
| 96%-100% | 500 ms |
| 86%-95% | 400 ms |
| 71%-85% | 300 ms |
| 51%-70% | 200 ms |
| 31%-50% | 100 ms |
| 11%-30% | 80 ms |
| 1%-10% | 50 ms |

Using the above table, the scheduler (410) allocates 200 ms to each thread (thread J, thread E, thread A) in group X, 50 ms to each thread (thread I, thread D) in group Y, and 100 ms to each thread (thread F, thread B, thread C, thread H, thread G) in group Z. Finally, the scheduler (410) assigns the same priority to each thread in each thread group. As shown in FIG. 4C, each thread (thread J, thread E, thread A) in group X is assigned a priority of 1, each thread (thread I, thread D) in group Y is assigned a priority of 2, and each thread (thread F, thread B, thread C, thread H, thread G) in group Z is assigned a priority of 3. Once the cores and time-quantums have been allocated and the priorities assigned, the threads are executed according to the schedule policy described above. Specifically, each thread in the thread groups executes on the allocated cores for the allocated time-quantum.

Figure 5:
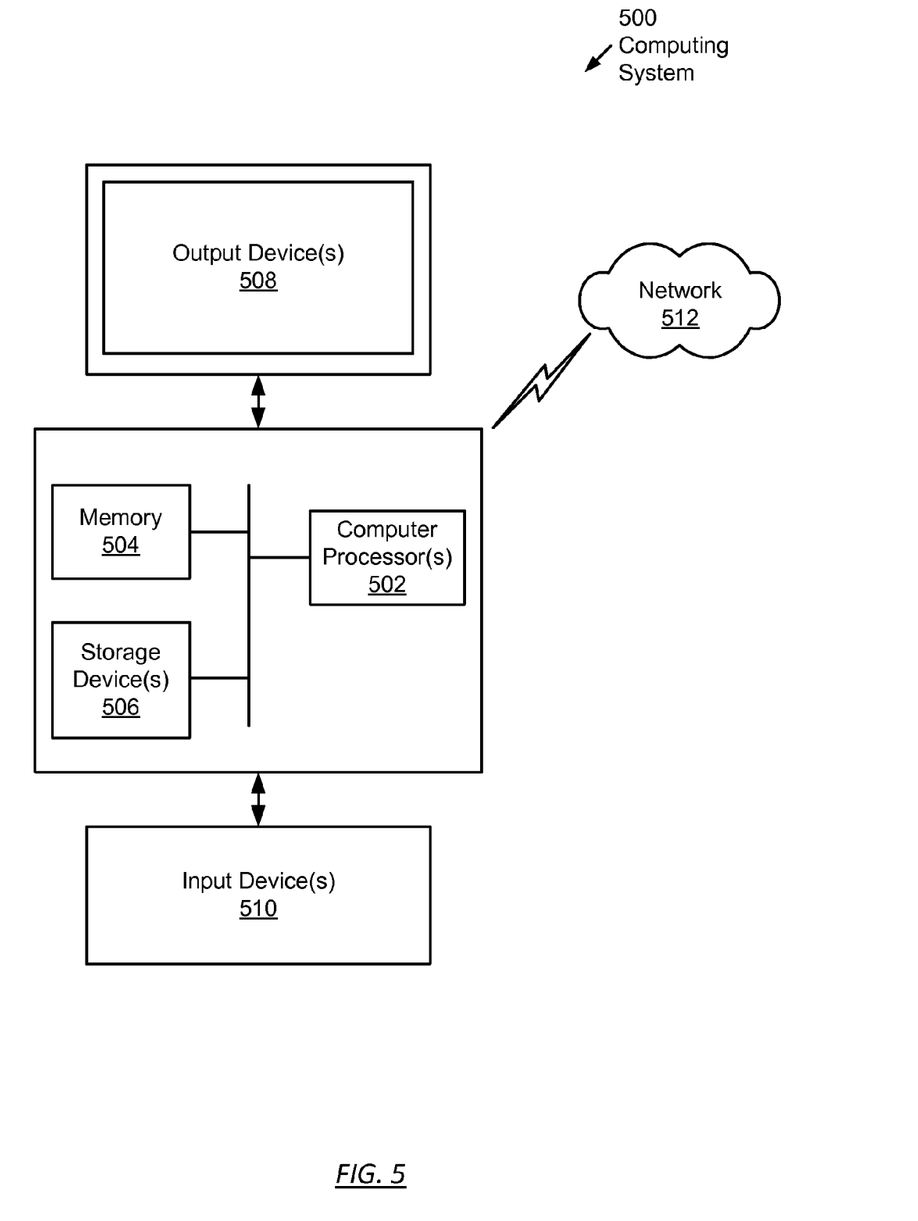
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (514) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (514). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer-readable medium comprising instructions, which when executed by a processor perform a method, the method comprising:
   obtaining lock overhead times for a plurality of threads;
   generating a set of thread groups, wherein each of the plurality of threads is assigned to one of the plurality of thread groups based on the lock overhead times;
   allocating at least one core of a multi-core system to each of the plurality of thread groups; and
   assigning a time-quantum for each of the plurality of thread groups,
   wherein the time-quantum for each of the plurality of thread groups corresponds to an amount of time that threads in each of the plurality of thread groups can execute on the at least one allocated core, and
   wherein assigning the time-quantum for each of the plurality of thread groups comprises using a time-quantum table specifying a time-quantum for each processor utilization range.

2. The non-transitory computer-readable medium of claim 1, the method further comprising:
   executing the threads in each of the thread groups on the at least one allocated core for the assigned time-quantum.

3. The non-transitory computer-readable medium of claim 1, wherein assigning each of the plurality of threads to one of the plurality of thread groups comprises using a k-means algorithm.

4. The non-transitory computer-readable medium of claim 1, wherein assigning each of the plurality of threads to one of the plurality of thread groups comprises placing threads with similar lock overhead times in a same thread group.

5. The non-transitory computer-readable medium of claim 1, wherein each of the lock overhead times corresponds to a percent of execution time that one of the plurality of threads waits for at least one lock.

6. The non-transitory computer-readable medium of claim 1, wherein allocating at least one core of the multi-core system to each of the plurality of thread groups comprises using a processor utilization of threads in the corresponding thread group.

7. The non-transitory computer-readable medium of claim 1, wherein allocating the at least one core of the multi-core system to each of the plurality of thread groups comprises using $$G_{cores} = \frac{G_{util}}{Total_{util}}(Total_{cores}),$$

wherein $G_{cores}$ is a number of cores allocated to a thread group of the plurality of thread groups, wherein $G_{util}$ is a processor utilization for the thread group, wherein $Total_{util}$ is a sum of all processor utilizations for the plurality of thread groups, and wherein $Total_{cores}$ is a number of cores in the multi-core system.

8. The non-transitory computer-readable medium of claim 7, wherein $G_{util}$ is calculated using $$G_{util} = \sum_{T=1}^{N} T_{util},$$

wherein $T_{util}$ is a processor utilization for a thread in the thread group, and wherein N is a number of threads in the thread group.

9. The non-transitory computer-readable medium of claim 1, wherein each of the plurality of threads in one of the plurality of thread groups is assigned a same priority level.

10. A system comprising:
    a plurality of cores;
    a thread monitor, wherein the thread monitor is configured to perform a method, the method comprising obtaining lock overhead times for a plurality of threads;
    a scheduler, wherein the scheduler is configured to perform a method, the method comprising:
       generating a set of thread groups, wherein each of the plurality of threads is assigned to one of the plurality of thread groups based on the lock overhead times;
       allocating at least one core of the plurality of cores to each of the plurality of thread groups; and
       assigning a time-quantum for each of the plurality of thread groups,
       wherein the time-quantum for each of the plurality of thread groups corresponds to an amount of time that threads in each of the plurality of thread groups can execute on the at least one allocated core, and
       wherein assigning the time-quantum for each of the plurality of thread groups comprises using a time-quantum table specifying a time-quantum for each processor utilization range.

11. The system of claim 10, wherein the system comprises a per-thread data structure for each of the plurality of threads, wherein the per-thread data structure is configured to store lock overhead times for each of the plurality of threads.

12. The system of claim 10, wherein all threads in one of the plurality of thread groups are set to a same priority level.

13. The system of claim 10, the method further comprising:
    executing the threads in each of the thread groups on the at least one allocated core for the assigned time-quantum.

14. The system of claim 10, wherein assigning each of the plurality of threads to one of the plurality of thread groups comprises using a k-means algorithm.

15. The system of claim 10, wherein assigning each of the plurality of threads to one of the plurality of thread groups comprises placing threads with similar lock overhead times in a same thread group.

16. The system of claim 10, wherein each of the lock overhead times corresponds to a percent of execution time that one of the plurality of threads waits for at least one lock.

17. The system of claim 10, wherein allocating at least one core of the multi-core system to each of the plurality of thread groups comprises using a processor utilization of threads in the corresponding thread group.

18. The system of claim 10, wherein allocating the at least one core of the multi-core system to each of the plurality of thread groups comprises using $$G_{cores} = \frac{G_{util}}{Total_{util}}(Total_{cores}),$$

wherein $G_{cores}$ is a number of cores allocated to a thread group of the plurality of thread groups, wherein $G_{util}$ is a processor utilization for the thread group, wherein $Total_{util}$ is a sum of all processor utilizations for the plurality of thread groups, and wherein $Total_{cores}$ is a number of cores in the multi-core system.

* * * * *